US006260355B1

(12) United States Patent
Rausch et al.

(10) Patent No.: US 6,260,355 B1
(45) Date of Patent: Jul. 17, 2001

(54) HYDRAULIC CONTROL SYSTEM FOR A MOBILE WORK MACHINE, ESPECIALLY A WHEEL LOADER

(75) Inventors: Georg Rausch, Lohr/Main; Dieter Roth, Schlüchtern, both of (DE)

(73) Assignee: Mannesmann Rexroth AG, Lohr/Main (DE)

( * ) Notice: Subject to any disclaimer, the term of this patent is extended or adjusted under 35 U.S.C. 154(b) by 0 days.

(21) Appl. No.: 09/381,439

(22) PCT Filed: Mar. 17, 1998

(86) PCT No.: PCT/EP98/01543

§ 371 Date: Sep. 16, 1999

§ 102(e) Date: Sep. 16, 1999

(87) PCT Pub. No.: WO98/42923

PCT Pub. Date: Oct. 1, 1998

(30) Foreign Application Priority Data

Mar. 21, 1997 (DE) ............................................. 197 11 769

(51) Int. Cl.[7] ...................................................... F16D 31/02

(52) U.S. Cl. ................................................ 60/413; 60/470

(58) Field of Search ............................. 60/413, 414, 416, 60/470

(56) References Cited

U.S. PATENT DOCUMENTS 3,717,995 * 2/1973 Case ....................................... 60/470
3,971,215 * 7/1976 Baron et al. ........................ 60/414 X
5,034,892 7/1991 Saotome .
5,116,188 * 5/1992 Kurohashi et al. ................ 60/413 X
5,195,864 3/1993 Drake et al. .
5,245,826 * 9/1993 Roth et al. ............................. 60/413
5,477,677 * 12/1995 Krnavek ................................. 60/414
5,992,146 * 11/1999 Hausman ............................... 60/413
6,167,701 * 1/2001 Hatcher et al. ........................ 60/416

FOREIGN PATENT DOCUMENTS 3909205 5/1990 (DE) .
68918930 8/1990 (DE) .
4129509 3/1993 (DE) .
4221943 3/1993 (DE) .
4416228 11/1995 (DE) .

OTHER PUBLICATIONS

Patent Abstracts of Japan, vol. 012, No. 347 (M–743), Sep. 19, 1988, & JP 63 106404 A (Komatsu Ltd) May 11, 1988.
Patent Abstracts of Japan, vol. 014, No. 464 (M–1033) Oct. 9, 1990 –& JP 02 186020 A (Yutani Heavy Ind. Ltd), Jul. 20, 1990.

(List continued on next page.)

*Primary Examiner*—John E. Ryznic
(74) *Attorney, Agent, or Firm*—Martin A. Farber

(57) ABSTRACT

An hydraulic control arrangement which is chiefly used for a mobile working machine, especially for a wheel loader, and has at least one hydraulic cylinder with the aid of which a working tool can be moved, a directional control valve for controlling the pressure-fluid channels between the hydraulic cylinder, a pressure-fluid source and a tank, a hydraulic accumulator which can be connected to the pressure-fluid source via a filling line, and a control valve with the aid of which a connection between the hydraulic accumulator and the hydraulic cylinder can be controlled to open and close. The aim of such a hydraulic control arrangement is to avoid undesired movements of the hydraulic cylinder. This is achieved wherein the fact that the hydraulic accumulator can be filled up only when the directional control valve is actuated.

16 Claims, 3 Drawing Sheets

OTHER PUBLICATIONS

Patent Abstracts of Japan, vol. 016, No. 374 (M–1293) Aug. 11, 1992 –& JP 04 120323 A (Komatsu Ltd), Apr. 21, 1992.

Patent Abstracts of Japan, vol. 017, No. 569 (M–1496) Oct. 15, 1993, –& JP 05 163745 A (Komatsu Ltd). Jun. 29, 1993.

Patent Abstracts of Japan, vol. 095, No. 001, Feb. 28, 1995 –& JP 06 286446 A (Hitachi Constr Mach Co Ltd), Oct. 11, 1994.

Patent Abstracts of Japan, vol. 010, No. 187 (M–493), Jul. 2, 1986 –& JP 61 031534 A (Komatsu Ltd), Feb. 14, 1986.

Patent Abstracts of Japan, vol. 095, No. 001, Feb. 28, 1995 –& JP 06 280287 A (Komatsu Mec Corp; Others: 01), Oct. 4, 1994.

Patent Abstracts of Japan, vol. 13, No. 265 (M–839) Jun. 19, 1989 –& JP 1–66324 (A) (Kobe Steel Ltd), Mar. 13, 1989.

Patent Abstracts of Japan, vol. 16, No. 1–19, (M–1225) Mar. 25, 1992, –& JP 3–286047 (A) (Toyo Umpanki Co Ltd) Dec. 17, 1991.

* cited by examiner

HYDRAULIC CONTROL SYSTEM FOR A MOBILE WORK MACHINE, ESPECIALLY A WHEEL LOADER

FIELD AND BACKGROUND OF THE INVENTION

The invention relates to a hydraulic control arrangement which is used for a mobile working machine, especially for a wheel loader.

It is known from DE 39 09 205 C1 to make use for the purpose of damping the pitching vibrations of wheel loaders which occur, especially, with a full loading shovel and at a high driving speed of a damping system which is a component of the hydraulic control arrangement of the wheel loader. For the purpose of vibration damping, the generally two hydraulic lifting cylinders for raising and lowering the loading shovels can be connected via a shutoff valve to a hydraulic accumulator which can be charged by a hydraulic pump via a fill line which branches off from the pump line upstream of the directional control valve block. The shutoff valve, which is arranged between the hydraulic accumulator and the lifting cylinders, is closed as long as the loading shovels are working, and can be opened by the driver or automatically as soon as pitching vibrations occur during driving, or as soon as the driving speed is above a specific value, for example above 6 km/h.

As a consequence of the fact that the filling line branches off upstream of the directional valve control block, the hydraulic accumulator is charged not only upon actuation of the directional control valve assigned to the lifting cylinders, but upon actuation of any direction control valve which leads to a build up of pressure in the pump line. For example, the actuation of a steering valve belonging to a hydraulic steering system of the working machine can also lead to an inflow of pressure fluid to the hydraulic accumulator. If the shutoff valve is then also open, an uncontrolled movement of the lifting cylinders can take place.

Another damping system against pitching vibrations, which is likewise part of the hydraulic control arrangement of a working machine, is known from DE 41 29 509 C2. In this case, the filling line branches off from a working line which runs between the lifting cylinders and the directional control valve assigned thereto. The shutoff valve arranged in the filling line is pressure-controlled and can be opened by the load pressure, prevailing in the working line, of the lifting cylinders against the accumulator pressure, which can be applied to a rear control chamber on the valve element of the shutoff valve, and against the force of a weak compression spring. The accumulator pressure is thus in each case only slightly lower than the highest load pressure of the lifting cylinders which occurs during a working cycle. In order to damp the pitching vibrations, the rear control member of the shutoff valve is unloaded via a pilot valve to the tank, with the result that the shutoff valve can be opened and pressure fluid can be pushed back and forth freely between the hydraulic accumulator and the lifting cylinders.

It has emerged that because of special kinematic relationships on a wheel loader when the shovel is being pushed into the earth, a higher pressure can be built up in the lifting cylinders than prevails in the hydraulic accumulator, and then pressure fluid is displaced into the hydraulic accumulator from the lifting cylinders even when the assigned directional control valve is not actuated. The wheel loader is raised at the front, with the result that the front wheels turn in the air and the rear wheels dig in. This is disadvantageous for the loading operation.

SUMMARY OF THE INVENTION

It is the object of the invention further to develop a hydraulic control arrangement of the introductory-mentioned type so as largely to avoid uncontrolled movements of the hydraulic cylinder which can be connected to the hydraulic accumulator in order to damp pitching vibrations of the working machine.

According to the invention, this object is achieved in the case of a hydraulic control arrangement having the features from the preamble of claim 1 by virtue of the fact that the hydraulic accumulator can be filled up only when the directional control valve, which is assigned to the hydraulic cylinder, is actuated. Consequently, upon actuation of another directional control value no pressure fluid can flow into the hydraulic accumulator, with the result that the actuation of another directional control valve cannot lead to a movement of the hydraulic cylinder. It is also prevented that pressure fluid is displaced into the hydraulic accumulator from the hydraulic cylinder when the directional control valve is not actuated. The enclosed pressure fluid therefore prevents a movement of the cylinder piston and thus a change in the relative position between the boom and the body of the working machine, with the result that raising of the front axle is prevented.

The hydraulic cylinder is usually a double-acting one and can be controlled with the aid of a directional control valve which can be adjusted into working positions in two opposite directions starting from a middle neutral position. In accordance a feature of the invention it is provided that the hydraulic accumulator can be filled up only when the directional control valve is actuated in one direction. The control arrangement is thereby simplified. In the case of a wheel loader, for example, it suffices when pressure fluid can flow into the hydraulic accumulator only given an actuation of the directional control valve in the direction of raising the lifting cylinders.

In accordance with another feature of the invention, use is advantageously made for the purpose of controlling the capacity of the hydraulic accumulator to be filled of a control valve which can be switched over by actuating the directional control valve from a first control position, in which it prevents filling of the hydraulic accumulator, that is to say in which the filling line is blocked off such that no pressure fluid flows into the hydraulic accumulator even when the pump pressure or the load pressure is higher than the accumulator pressure into a second control position, in which the hydraulic accumulator can be filled.

The control valve which can be switched over by actuating the directional control valve is advantageously a seated valve, thus ensuring the filling line is blocked off in a largely leak-free fashion.

It is conceivable in principle for the control valve which can be switched over by actuating the directional control valve to be coupled mechanically to the latter. Directional control valves which are used in mobile hydraulics are currently ever more frequently driven no longer directly mechanically but with the aid of precontrol signals which can be prescribed with the aid of a precontrol unit. In accordance with still another feature of the invention, a precontrol signal for the directional control valve is also used for the purpose of producing a control signal for switching over the control valve from the first control position into the second control position.

Particularly preferred is a refinement according to which the filling line branches off from a working line running between the directional control valve and the hydraulic cylinder, and there is located in the filling line a pressure-controlled shutoff valve with a valve element to which the load pressure prevailing in the working line can be applied in the opening direction and the pressure in a rear control chamber can be applied in the closing direction. The rear control chamber is connected to the hydraulic accumulator in order to fill the hydraulic accumulator. An open connection between the hydraulic accumulator and the hydraulic cylinder must be present in order to damp the pitching vibrations of the working machine. The rear control chamber is unloaded with respect to the tank for this purpose. The rear control chamber can be blocked off against the outflow of pressure fluid in order to prevent filling of the hydraulic accumulator when the directional control valve is not actuated. The shutoff valve then cannot be opened by the load pressure.

BRIEF DESCRIPTION OF THE DRAWINGS

A plurality of exemplary embodiments of a hydraulic control arrangement according to the invention are represented in the drawings. The invention will now be explained in more detail with the aid of these exemplary embodiments.

In the drawings.

DETAILED DESCRIPTION OF THE PREFERRED EMBODIMENTS

Figure 1:
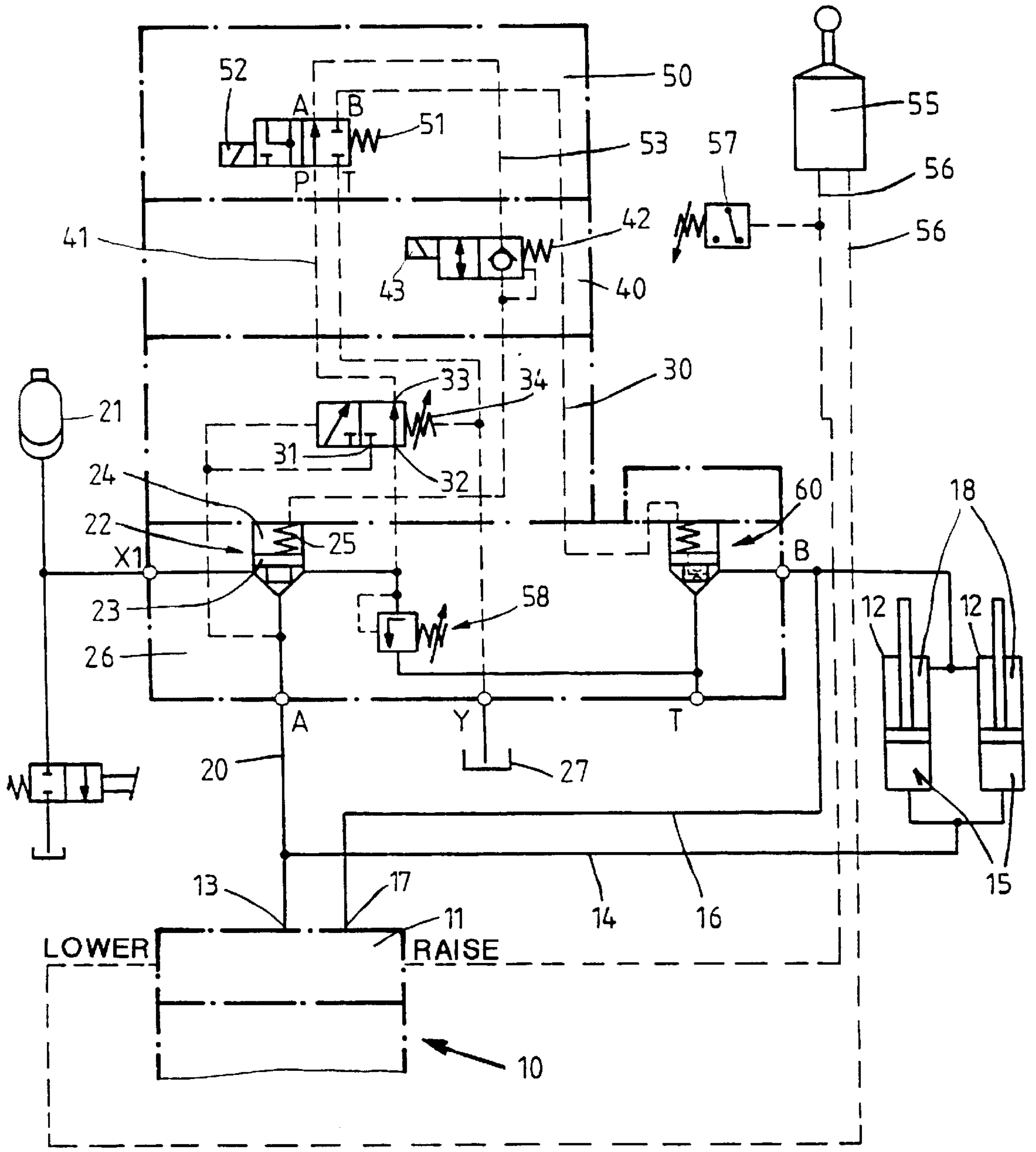
FIG. 1 shows the first exemplary embodiment, in which the filling line is connected to the working line, which leads to two hydraulic cylinders, and there is located in the filling line a shutoff valve which is controlled by two pilot valves which can be actuated electromagnetically.

The hydraulic control arrangements shown are provided in each case for wheel loaders, tractors, telescopic handling equipment or other machines, and comprise a control block 10 with a plurality of directional control valves, especially also with a directional control valve 11 which can assume a spring-centered mid-position, and with the aid of which it is possible to drive two hydraulic cylinders 12 which are designed as differential cylinders and with the aid of which the boom of a wheel loader can be raised and lowered. The directional control valve 11 has a first working port 13 from which a first working line 14 leads to the base-side pressure chambers 15 of the hydraulic cylinders 12. A second working line 16 runs between a second working port 17 of the directional control valve 11 and the pressure chambers 18, on the piston-rod side, of the hydraulic cylinders 12.

In the embodiment according to FIG. 1, a filling line 20 which leads to a hydraulic accumulator 21 branches off from the working line 14. Arranged in the filling line is a shutoff valve 22 which is designed as a 2-way cartridge valve and has a movable valve element 23. The latter is a differential piston which can be seated on a seating cone with the end face of the piston section of smaller diameter, in the manner of a seated valve. The pressure prevailing in the working line 14, that is to say the load pressure of the two hydraulic cylinders 12 is applied in the opening direction to the valve element 23 at said end face. The accumulator pressure acts in the opening direction at the annular surface between the two piston sections of the valve element 23. A pressure prevailing in a rear control chamber 24, and a weak compression spring 25 are applied to the valve element 23 in the closing direction.

Three further valves are constructed on the plate 26 with the 2-way cartridge valve 22. The first valve 30 is a 3/2-way valve with a first inlet 31, which is connected to the section of the filling line 20 located between the working line 14 and the shutoff valve 22, and with a second inlet 32, which is connected to the hydraulic accumulator 21. An outlet 33 of the directional control valve 30 can be connected either to the inlet valve 31 or to the inlet 32, depending on the load pressure in the working line 14. To be specific, a settable compression spring acts on the valve element (not represented in more detail) of the valve 30 in order to connect the outlet 33 to the inlet 32. The pressure in the inlet 31, that is to say the load pressure of the hydraulic cylinder 12, is applied to the valve element in order to connect the outlet 33 to the inlet 31.

Mounted on the directional control valve 30 is a pilot valve 40 which is designed as a 2/2-way seated valve and can be regarded as a pilot-operated check valve. A control channel 41 emerging from the outlet 33 of the directional control valve 30 leads through the housing of the pilot valve 40 to a port P of a further pilot valve 50, which is a 4/2-way valve. Under the action of a compression spring 51, the valve element of the said 4/2-way valve assumes a neutral position in which there is a passage between the port P and a port A which is connected to a port of the pilot valve 40. A tank port T and a further port B of the pilot valve 50 are blocked off in the neutral position of the latter. The tank port is connected to a leak port Y of the plate 26 via channels leading through the housings of the various valves. The port B of the pilot valve 50 is connected to the rear control chamber of a second 2-way cartridge valve 60, which is located in the plate 26 and via which the pressure chambers 18, on the side of the piston rods, of the hydraulic cylinders 12 can be connected to a tank port T of the plate 26. The valve element of the pilot valve 50 can be brought by an electromagnet 52 into a control position in which the port P is blocked off and two ports A and B are connected to the port T.

The pilot valve 40 is arranged in a line 53 between the port A of the pilot valve 50 and the rear control chamber 24 of the shutoff valve 22. A compression spring 42 and the pressure prevailing in the rear control chamber of the shutoff valve 22 are applied to the valve element of said pilot valve 40 in the direction of a neutral position in which said valve element prevents an outflow of pressure fluid from the rear control chamber 24 to the port A of the pilot valve 50, but permits an inflow of pressure fluid from the port A of the pilot valve 50 into the rear control chamber 24. The valve element can be brought by an electromagnet 43 into a control position in which there is a free passage between the port A of the pilot valve 50 and the rear control chamber 24 of the shutoff valve 22.

The directional control valve 11 of the control block 10 can be actuated in a hydraulically proportional fashion, the precontrol pressures being produced with the aid of a hydraulic precontrol unit 55 and being given to the directional control valve 11 via control lines 56. An electric pressure switch 57 which can be switched over at a specific precontrol pressure is connected to the precontrol line, into which a precontrol pressure can be introduced when the hydraulic cylinder 12 is to be actuated in the direction of raising the boom and for this purpose pressure fluid is applied to the base-side pressure chambers 15. This specific precontrol pressure is preferably the precontrol pressure at which the spring-centered sliding spool of the directional control valve 11 begins to move. The switching over of the pressure switch 57 excites the electromagnet 43 of the pilot valve 40, and said pilot valve is brought into the control position in which an open connection prevails between the port A of the pilot valve 50 and the rear control chamber 24 of the shutoff valve 22.

Voltage is applied to the electromagnet 52 of the pilot valve 50 arbitrarily by the vehicle driver when pitching vibrations occur, or automatically at a specific speed of the mobile working machine, for example at a speed of 6 km/h.

In the neutral position of the directional control valve 11, there is no precontrol pressure in the precontrol line 56, to which the pressure switch 57 is connected, with the result that the pressure switch 57 is in its neutral position and the electromagnet 43 of the pilot valve 40 is de-excited. The pilot valve 40 therefore assumes the control position shown in FIG. 1, in which an outflow of pressure fluid from the rear control chamber 24 of the shutoff valve 22 is prevented. Should a pressure build up in the pressure chambers 15 of the hydraulic cylinders 12 when the loading shovel is put into the earth or other bulk material, the shutoff valve 22 cannot be opened by this pressure, since opening the shutoff valve would be possible only if pressure fluid were displaced from the control chamber 24. The charging state of the hydraulic accumulator 21 is therefore not influenced by the build up of pressure in the pressure chambers 15. The same holds when the directional control valve is actuated in the direction of lowering the hydraulic cylinders 12. The pilot valve 40 then also remains in the control position shown, with the result that the shutoff valve 22 cannot be opened by the pressure in the pressure chambers 15 of the hydraulic cylinders 12.

When, by contrast, the directional control valve 11 is actuated in the raising direction, the pressure switch 57 switches over, as a result of which the electromagnet 43 is actuated and the valve element of the pilot valve 40 reaches the second control position. As long as the pressure in the pressure chambers 15 remains below the pressure set at the compression spring 34 of the directional control valve 30, the latter switches the accumulator pressure through via the pilot valve 50 and the pilot valve 40 to the rear control chamber 24 of the shutoff valve 22. The load pressure in the pressure chambers 15 of the hydraulic cylinders 12 now opens the shutoff valve 22 whenever it is above the accumulator pressure by at least the small pressure difference equivalent to the force of the compression spring 25. Pressure fluid can then reach into the hydraulic accumulator, with the result that, neglecting the source of the weak compression spring 25 for once, said hydraulic accumulator is always charged up to the highest load pressure occurring in the pressure chambers 15 during a working cycle. Only when the load pressure at the valve 30 is able to overcome the force of the compression spring 34 does the shutoff valve 22 remain closed. The point is that after the valve 30 is switched over the load pressure is present in the rear control chamber 24 of the shutoff valve 22, with the result that the shutoff valve 22 is reliably closed in conjunction with the compression spring 25. The pressure in the hydraulic accumulator 21 can therefore not exceed the value set at the compression spring 34 of the valve 30. However, for safety reasons provision is also made of a relief valve 58 the inlet of which is connected to the hydraulic accumulator 21.

It may now be assumed that the loading shovel is loaded and that the wheel loader is being driven to an unloading site. As soon as in this case a specific speed is exceeded, current flows through the two magnets 43 and 52 of the pilot valves 40 and 50, with the result that the two pilot valves switch over from the neutral positions shown in FIG. 1 into the other control position. The rear control chamber 24 of the shutoff valve 22 is now connected via the pilot valve 40 and via the pilot valve 50 to the port Y of the plate 26, and thus unloaded with respect to the tank 27. The valve element 23 of the shutoff valve 22 is raised from its seat by the load pressure and accumulator pressure, with the result that there is an open connection between the hydraulic accumulator 21 and the pressure chamber 15 of the hydraulic cylinders 12. Since the accumulator pressure 21 corresponds to the maximum pressure reached during the working cycle, upon opening of the shutoff valve 22 no sinking of the loading shovel occurs, but rather a slight raising. It may well be that load pressures occur during the working cycle which cause the valve 30 to switch, and which therefore are not followed by the loading state of the hydraulic accumulator 21. However, these load pressures occur only in special situations, for example when an object anchored in the ground tears free, or when the loading shovel is driven against a stop, but are not caused by the weight of the loading shovel and the loading material, which acts solely when the wheel loader is being driven. The loading state of the hydraulic accumulator 21 is therefore always sufficient to keep the loading shovel at the level which the latter assumes upon opening of the shutoff valve.

In order to balance volumetric changes in the pressure chambers 18 which occur during the open connection of the pressure chambers 15 to the hydraulic accumulator 21, pressure fluid can be displaced from the pressure chambers 18, on the side of the piston rod, of the hydraulic cylinders 12 into the tank, or fed in out of the tank via the valve 60, which is likewise opened by the switching over of the pilot valve 50.

Figure 2:
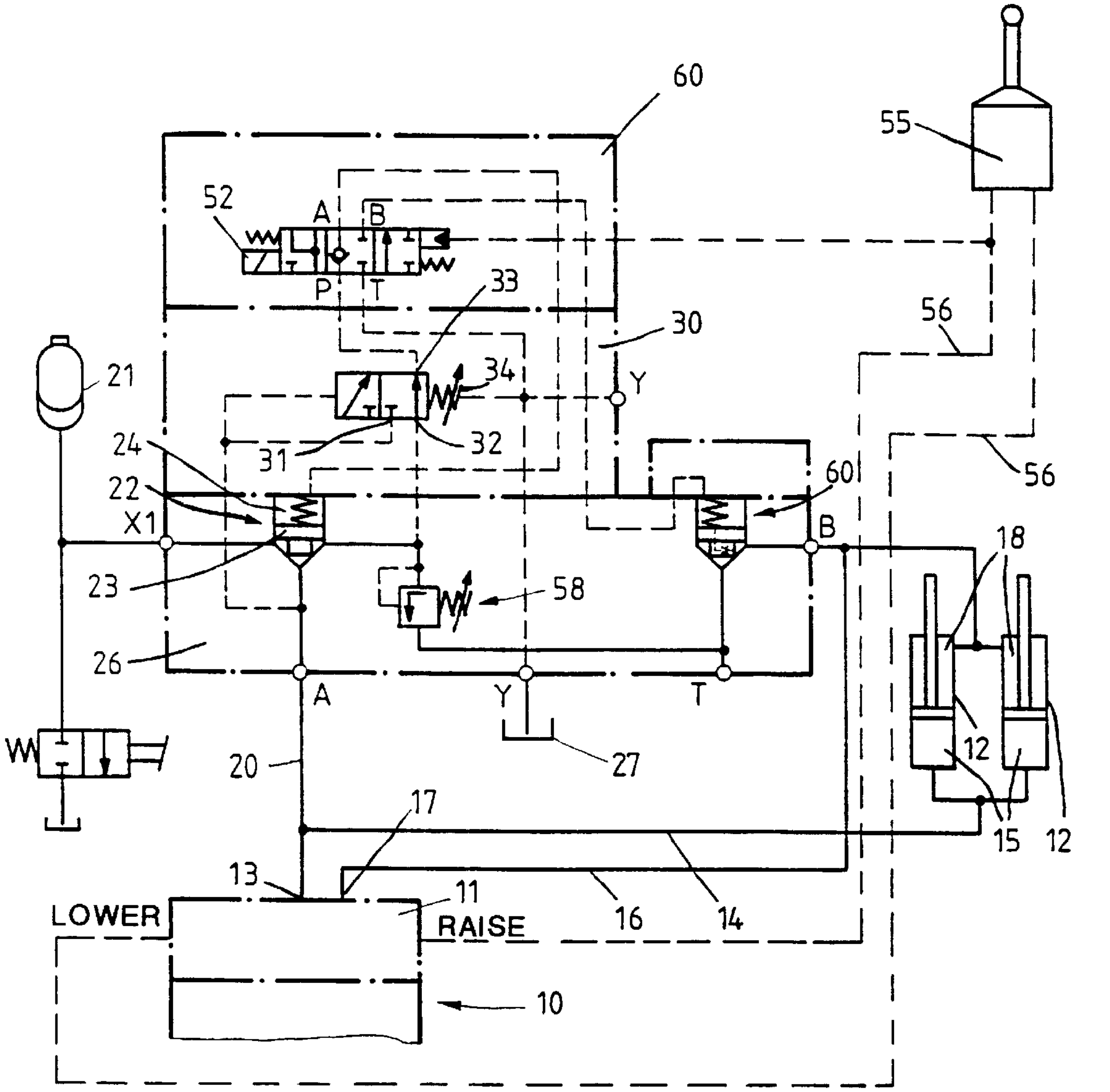
FIG. 2 shows the second embodiment, which is largely of identical design to the first embodiment, and in the case of which two individual pilot valves of the first embodiment are combined to form a single pilot valve.

The design according to FIG. 2 differs only with regard to the pilot valves 40 and 50 from that according to FIG. 1. Reference is therefore made to the corresponding description of FIG. 1 with regard to the control block 10, the hydraulic cylinder 12, the hydraulic accumulator 21, the shutoff valves 22 and 60, the directional control valve 30 and the precontrol unit 55. By contrast with the design according to FIG. 1, the two pilot valves 40 and 50 are now combined to form a single pilot valve 60 which is mounted on the directional control valve 30. The pilot valve 60 has a spring-centered mid-position in which the ports T and B are blocked off and only a throughflow from P to A is possible between the ports P and A. By driving an electromagnet 52, the valve element of the pilot valve 60 can be brought from the mid-position into a lateral control position in which the ports A and B are connected to the port T. The valve element can be adjusted from the mid-position in the opposite direction by applying to it the pressure prevailing in the precontrol line 56, in which a precontrol pressure is built up in order to feed pressure fluid into the base-side pressure chambers 15 of the hydraulic cylinders 12. The port A is freely connected to the port P in this other control position of the directional control valve 60. The port A is now connected directly to the rear control chamber 24 of the shutoff valve 22.

The pilot valve 60 assumes its mid-position in the mid-position or in the lowered position of the directional control valve 11, if the speed of the working machine does not exceed a specific value or the electromagnet 52 has not arbitrarily been switched on. In the raised position of the directional valve 11, pressure is applied to the valve element of the directional control valve 60, which reaches the control position in which the port P is connected to the port A. Depending on the position of the valve 30, the accumulator or the load pressure is then present in the rear control chamber 24 of the shutoff valve 22. The hydraulic accumulator is charged up to the maximum load pressure achieved or to the pressure set at the compression spring 34 of the valve 30. The electromagnet 52 is excited in order to damp pitching vibrations during a rapid drive, with the result that the valve element of the directional control valve 60 reaches the control position in which the ports A and B are connected to the port T. The rear control chambers of the shutoff valves 22 and 60 are relieved of pressure, with the result that the two shutoff valves 22 and 60 open, and an open connection exists between the hydraulic accumulator 21 and the pressure chambers 15 of the hydraulic cylinders 12, and pressure fluid can be displaced from the pressure chambers 18, and pressure fluid can be fed into the pressure chambers 18. Reference may be made explicitly at this juncture to the fact that the pressure at the port T of a valve block is usually a few bars above the tank pressure which prevails at the leakage oil port Y, with the result that the shutoff valve 60 can be opened against the tank pressure in the rear control chamber by the pressure at the tank terminal T.

It is particularly advantageous that after slowing down the drive and de-exciting the electromagnets 43 and 52 in the case of the design according to FIG. 1, and de-exciting the electromagnet 52 alone in the case of the design according to FIG. 2, because of the mode of operation of the pilot valves 40 and 60 as check valves accumulator pressure is immediately introduced into the rear control chamber 24 of the shutoff valve 22, and the shutoff valve therefore closes. An influence exerted on the hydraulic accumulator 21, or an influence exerted by the hydraulic accumulator 21 on the control is then excluded upon a subsequent lowering of the hydraulic cylinders 12 or an unloading of the shovel, during which time the directional control valve 11 is in its mid-position.

Figure 3:
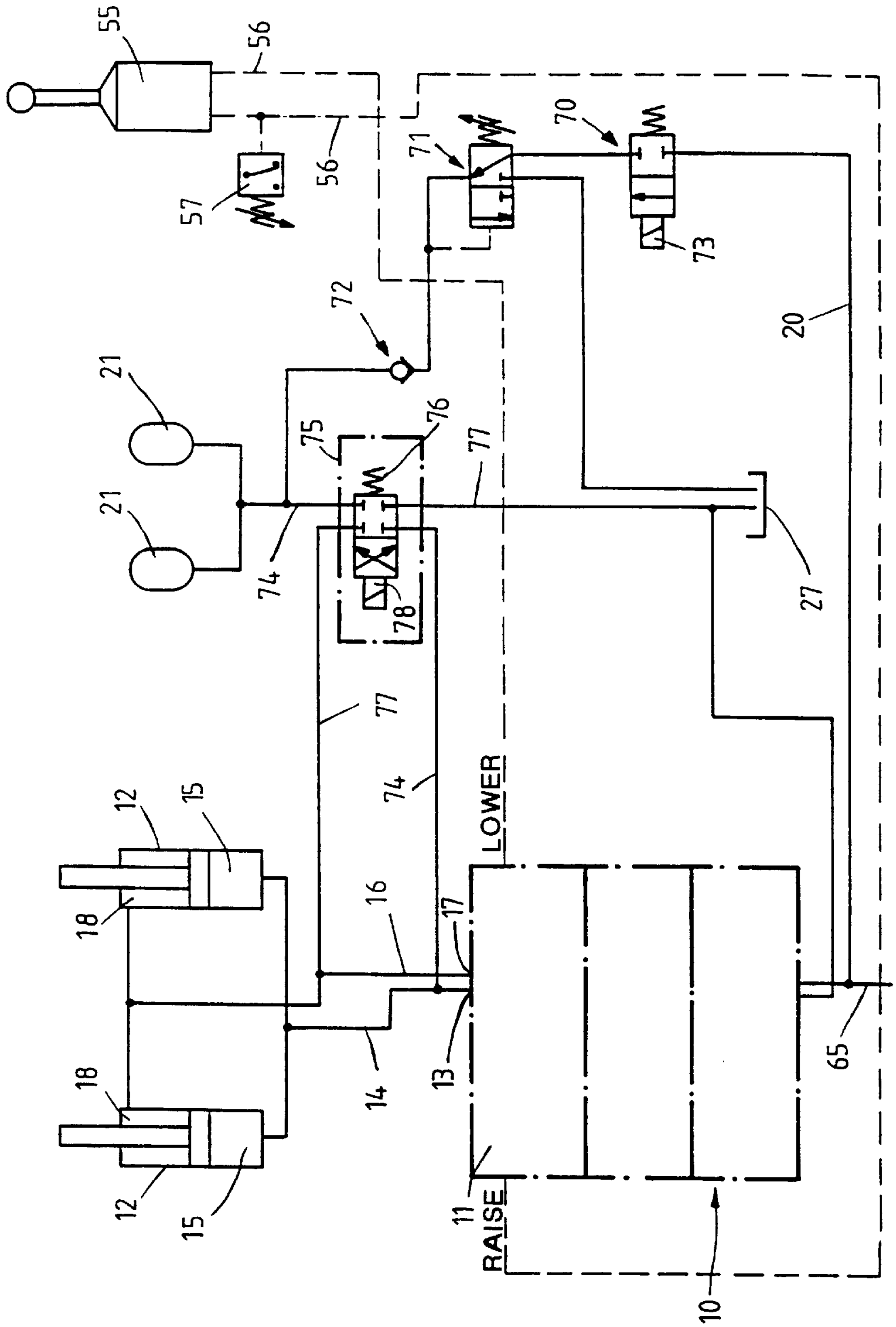
FIG. 3 shows a third embodiment, in which the filling line branches off from the pump line upstream of the directional control valve, and is located in the filling line of a control valve with the aid of which the filling line can be blocked off when the directional control valve is not actuated.

In the design according to FIG. 3, the filling line 20 branches off from a pump line 65 upstream of the valve control block 10. Seen in the direction of flow of the pressure fluid from the pump line 65 to the hydraulic cylinders 21, firstly a 2/2-way valve 70, a pressure control valve 71 and a check valve 72 are arranged in the filling line 20 leading to a plurality of hydraulic accumulators 21. In the neutral position of the directional control valve 70 brought about by a compression spring, the two ports thereof are blocked off against one another. By driving an electromagnet 73, the directional control valve can be switched to a through position. To be specific, the electromagnet 73 is always excited when the directional control valve 11 located inside the control block 10 is actuated in the raising direction in order to drive the hydraulic cylinder 12. The directional control valve 70 is in its initial position in the mid-position of the directional control valve 11 and when the latter is actuated in the lowering direction.

A maximum pressure up to which the hydraulic accumulators 21 can be charged is set at the pressure control valve 71. As long as this pressure has not been reached, the pressure control valve switches through the outlet of the directional control valve 70 to the check valve 72. When the pressure is reached, the inlet of the valve 71 which is connected to the outlet of the directional control valve 70 is blocked, and the port connected to the check valve is connected to the tank.

The hydraulic accumulators 21 can be connected via a line 74 to the working line 14 running between the working port 13 of the directional control valve and the pressure chambers 15 of the hydraulic cylinders 12. Installed in this line 74 is 4/2-way valve 75 which assumes under the action of a compression spring 76 a neutral position in which two sections of the line 74 are blocked off from one another so that there is no connection between the hydraulic accumulators 21 and the working line 14. In addition to the two ports required for opening and closing the line 74, the directional control valve 75 has two further ports for two sections of a line 77 which leads to the tank 27 from the working line 15 between the directional control valve 11 and the pressure chambers 18 of the hydraulic cylinders 12. The two sections of the line 77 are also blocked off from one another in the neutral position of the directional control valve 75. The directional control valve 75 can be brought by an electromagnet 78 into a control position in which the two sections of the line 74 and the two sections of the line 77 are respectively connected to one another. The electromagnet 78 is excited when the working machine, which is equipped with the indicated hydraulic control arrangement, exceeds a specific driving speed. The hydraulic accumulators 21 are then connected to the pressure chambers 15 of the hydraulic cylinders 12, with the result that pitching vibrations can be damped. Volumetric changes in the pressure chambers 18 can be balanced via the line 77.

Since the electromagnet 73 of the directional control valve 70 is excited only when the directional control valve 11 is actuated in the direction of raising the hydraulic cylinders 12, that is to say when the pressure chambers 15 are fed pressure fluid, it is only then that the hydraulic accumulators 21 can be charged. It cannot, for example, happen that in the case of a pressure present in the line 65 when the working machine is being driven fast reaches the pressure chambers 15 of the hydraulic cylinders 12 via the filling line 20 and valve 75, which is switched during rapid driving, even if the directional control valve 11 is in the mid-position and it is not desired for the piston rods of the hydraulic cylinders 12 to be extended.

What is claimed is:

1. Hydraulic control arrangement for a mobile working machine, especially for a wheel loader, comprising at least one hydraulic cylinder (12) with aid of which a working tool can be moved, a directional control valve (11) for controlling the pressure-fluid channels between the hydraulic cylinder (12), a pressure-fluid source and a tank (27), a hydraulic accumulator (21) which is connectable to the pressure-fluid source via a filling line (20), and a control valve (50, 60, 75) with aid of which a connection between the hydraulic accumulator (21) and the hydraulic cylinder (12) is controllable to open and close, and wherein the hydraulic accumulator (21) is fillable up only when the directional control valve (11) is actuated.

2. Hydraulic control arrangement according to claim 1, wherein the directional control valve (11) is adjustable into working positions in two opposite directions starting from a middle neutral position, and the hydraulic accumulator (21) is fillable up only when the directional control valve (11) is actuated in one direction.

3. Hydraulic control arrangement according to claim 1, wherein a control valve (40, 60, 70) is switchable over by actuating the directional control valve (11) from a first control position, in which it prevents filling of the hydraulic accumulator, into a second control position, in which the hydraulic accumulator (21) can be filled.

4. Hydraulic control arrangement according to claim 3, wherein the control valve (40, 60) which is switchable over by actuating the directional control valve (11) is a seated valve.

5. Hydraulic control arrangement according to claim 3, wherein the directional control valve (11) is drivable via a precontrol signal which is prescribable by aid of a precontrol (55), and, given presence of a precontrol signal for the directional control valve (11), a control signal for switching over from the first control position into the second control position is feedable to the control valve (40, 60, 70) which can be switched over by actuating the directional control valve (11).

6. Hydraulic control arrangement according to claim 3, wherein the filling line (20) branches off from a working line (14) running between the directional control valve (11) and the hydraulic cylinder (12), and wherein arranged in the filling line (20) is a pressure-controlled shutoff valve (22) with a valve element (23) to which the load pressure prevailing in the working line (14) is appliable in the opening direction and the pressure in a rear control chamber (24) is appliable in the closing direction, and the rear control chamber (24) is connectable to the hydraulic accumulator (21) in order to fill the hydraulic accumulator (21), and is connectable to the tank (27) in order to open the connection between the hydraulic accumulator (21) and the hydraulic cylinder (12), and is blockable off against the outflow of pressure fluid when the directional control valve (11) is not actuated.

7. Hydraulic control arrangement according to claim 6, wherein with the directional control valve (11) not actuated pressure fluid is appliable from the hydraulic accumulator (21) to the rear control chamber (24) of the control valve (22) by a check valve (40, 60) which opens toward the control chamber (24).

8. Hydraulic control arrangement according to claim 6, wherein a pilot valve (60) by means of which in a mid-position the rear control chamber (24) of the shutoff valve (22) is blocked off against the outflow of pressure fluid, which is adjustable from the mid-position into a first lateral control position in which the rear control chamber (24) is unloaded with respect to the tank (27), and which is adjustable by actuating the directional control valve (11) from the mid-position into a second lateral control position, in which accumulator pressure can be applied to the rear control chamber (24).

9. Hydraulic control arrangement according to claim 6, wherein a first pilot valve (50) having a control position in which the rear control chamber (24) of the shutoff valve (22) can be unloaded with respect to the tank (27), and having a control position in which accumulator pressure (21) is appliable to the rear control chamber (24), and a second pilot valve (40), which is arranged in the pressure-fluid channel (33) running from the rear control chamber (24) to the first pilot valve (50), and has a control position in which the pressure-fluid channel (53) is blocked off against outflow of pressure fluid from the rear control chamber (24), and a control position in which the pressure-fluid channel (53) is open.

10. Hydraulic control arrangement according to claim 9, wherein the two pilot valves (40, 50) can each respectively be actuated by an electromagnet (43, 52).

11. Hydraulic control arrangement according to claim 1, wherein the filling line (20) branches off from a working line (14) running between the directional control valve (11) and the hydraulic cylinder (12), and wherein arranged in the filling line (20) is a pressure-controlled shutoff valve (22) with a valve element (23) to which the load pressure prevailing in the working line (14) can be applied in the opening direction and the pressure in a rear control chamber (24) is appliable in the closing direction, and the rear control chamber (24) is connectable to the hydraulic accumulator (21) in order to fill the hydraulic accumulator (21), and can be connected to the tank (27) in order to open the connection between the hydraulic accumulator (21) and the hydraulic cylinder (12), and is blocked off against the outflow of pressure fluid when the directional control valve (11) is not actuated.

12. Hydraulic control arrangement according to claim 5, wherein the filling line (20) branches off from a working line (14) running between the directional control valve (11) and the hydraulic cylinder (12), and wherein arranged in the filling line (20) is a pressure-controlled shutoff valve (22) with a valve element (23) to which the load pressure prevailing in the working line (14) is appliable in the opening direction and the pressure in a rear control chamber (24) is appliable in the closing direction, and the rear control chamber (24) is connectable to the hydraulic accumulator (21) in order to fill the hydraulic accumulator (21), and is connectable to the tank (27) in order to open the connection between the hydraulic accumulator (21) and the hydraulic cylinder (12), and is blocked off against the outflow of pressure fluid when the directional control valve (11) is not actuated.

13. Hydraulic control arrangement according to claim 12, wherein with the directional control valve (11) not actuated pressure fluid is appliable from the hydraulic accumulator (21) to the rear control chamber (24) of the control valve (22) by a check valve (40, 60) which opens toward the control chamber (24).

14. Hydraulic control arrangement according to claim 12, wherein a pilot valve (60) by means of which in a mid-position the rear control chamber (24) of the shutoff valve (22) is blocked off against the outflow of pressure fluid, which is adjustable from the mid-position into a first lateral control position in which the rear control chamber (24) is unloaded with respect to the tank (27), and which is adjustable by actuating the directional control valve (11) from the mid-position into a second lateral control position, in which accumulator pressure can be applied to the rear control chamber (24).

15. Hydraulic control arrangement according to claim 12, wherein a first pilot valve (50) having a control position in which the rear control chamber (24) of the shutoff valve (22) is unloadable with respect to the tank (27), and having a control position in which accumulator pressure (21) is appliable to the rear control chamber (24), and a second pilot valve (40), which is arranged in the pressure-fluid channel (33) running from the rear control chamber (24) to the first pilot valve (50), and has a control position in which the pressure-fluid channel (53) is blocked off against outflow of pressure fluid from the rear control chamber (24), and a control position in which the pressure-fluid channel (53) is open.

16. Hydraulic control arrangement according to claim 15, wherein the two pilot valves (40, 50) are each respectively actuatable by an electromagnet (43, 52).

* * * * *